(12) United States Patent
Deloge et al.

(10) Patent No.: US 9,166,646 B1
(45) Date of Patent: Oct. 20, 2015

(54) TRANSCEIVER CIRCUIT AND METHOD FOR OPERATING A TRANSCEIVER CIRCUIT (71) Applicant: NXP B.V., Eindhoven (NL)

(72) Inventors: Mattieu Deloge, Eindhoven (NL); Arnoud Pieter van der Wel, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/468,034

(22) Filed: Aug. 25, 2014

(51) Int. Cl.
*H04B 1/00* (2006.01)
*H04B 15/00* (2006.01)
*H04B 1/40* (2015.01)
*H04L 12/40* (2006.01)

(52) U.S. Cl.
CPC . *H04B 1/40* (2013.01); *H04L 12/40* (2013.01)

(58) Field of Classification Search
USPC .......... 455/63.1, 67.11, 67.13, 67.15, 68, 69, 455/557
See application file for complete search history.

(56) References Cited

U.S. PATENT DOCUMENTS

| | | | | |
|---|---|---|---|---|
| 7,414,439 B2 * | 8/2008 | Sicard | ................. | H04L 25/0292 327/544 |
| 7,676,243 B2 * | 3/2010 | Leinonen | ............... | H04B 1/005 455/132 |
| 7,876,540 B2 * | 1/2011 | Deval | .................. | H01L 27/0266 361/56 |
| 8,054,911 B2 * | 11/2011 | Liebermann | ........... | H03K 17/16 327/47 |
| 8,295,797 B2 * | 10/2012 | Bagchi | ................. | H03G 3/0368 455/188.1 |
| 8,487,663 B2 * | 7/2013 | Redoute | ................... | H03K 5/12 327/108 |
| 8,503,940 B2 * | 8/2013 | Gebara | .................. | H04B 1/123 375/346 |
| 8,508,282 B2 * | 8/2013 | Sicard | ................... | H04L 25/026 327/434 |
| 8,625,725 B2 * | 1/2014 | Zeng | ................... | H04L 25/0292 375/316 |
| 8,832,474 B2 * | 9/2014 | Noller | ............... | H04L 12/40039 713/300 |
| 2009/0029656 A1 | 1/2009 | Sicard | | |
| 2009/0115462 A9 | 5/2009 | Redoute et al. | | |

OTHER PUBLICATIONS

Hardware Requirements for LIN, CAN and FlexRay Interfaces in Automotive Applications, Audi; BMW; Daimler; Porsche & Volkswagen, rev 1.2, 2011.
An EMI Resisting LIN Driver in 0.35-micron High-Voltage CMOS, Redoute, J. M. and Steyaert, M., IEEE journal of Solid-State Circuits, vol. 42, pp. 1574-1582, 2007.
LIN specification package, LIN consortium, rev 2.2a, 2010.
Combine Low Cost, High EMI and ultra-low Emissions in the LIN phy, Lopez D. et al, 2012, http://electronicdesign.com/energy/combine-low-cost-high-emi-immunity-and-ultra-low-emissions-lin-phy.

\* cited by examiner

*Primary Examiner* — Tuan A Tran (57) ABSTRACT

Embodiments of transceiver circuits and methods for operating a transceiver circuit are described. In one embodiment, a transceiver circuit includes a feedback loop connected to a bus and a control circuit connected to the bus. The feedback loop includes a tunable low-pass filter. The control circuit is configured to detect a radio frequency (RF) disturbance on the bus and control the bandwidth of the tunable low-pass filter in response to detection of the RF disturbance on the bus. Other embodiments are also described.

20 Claims, 10 Drawing Sheets

TRANSCEIVER CIRCUIT AND METHOD FOR OPERATING A TRANSCEIVER CIRCUIT

Embodiments of the invention relate generally to electrical circuits and methods for operating electrical circuits, and, more particularly, to communications circuits and methods for operating communications circuits.

Transceiver circuits are important components in a bus-based communications network. To insure proper transmission and reception of data through a communications bus, a transceiver circuit needs to achieve low electromagnetic emission (EME) during data transmission. In addition, a transceiver circuit needs to be robust against radio frequency (RF) electromagnetic disturbance or interference.

In a typical open-loop transceiver circuit, low EME is usually achieved by means of waveshaping that controls the transition time and the amplitude of an output voltage. However, a typical open-loop transceiver circuit is not able to compensate for impedance variations on a communications bus. Consequently, the output voltage of a typical open-loop transceiver circuit changes with the bus impedance, which affects the EME of the transceiver circuit.

Electromagnetic disturbance or interference on a communications bus can degrade the performance of transceiver circuits connected to the communications bus. Yet, data must be properly transmitted and received via the communications bus, even in the presence of RF disturbance. However, in a typical open-loop transceiver circuit, the voltage on a communications bus exhibits direct current (DC) shift, which can lead to bit errors in the transceiver circuit.

Embodiments of transceiver circuits and methods for operating a transceiver circuit are described. In one embodiment, a transceiver circuit includes a feedback loop connected to a bus and a control circuit connected to the bus. The feedback loop includes a tunable low-pass filter. The control circuit is configured to detect an RF disturbance on the bus and control the bandwidth of the tunable low-pass filter in response to detection of the RF disturbance on the bus. The transceiver circuit can adaptively adjust the tunable low-pass filter based on continuous-time feedback from the communications bus to protect the feedback loop from high-frequency (HF) disturbances. Other embodiments are also described.

In one embodiment, a method for operating a transceiver circuit involves detecting an RF disturbance on a bus connected to the transceiver circuit and controlling the bandwidth of a tunable low-pass filter of the transceiver circuit in response to detection of the RF disturbance on the bus.

In one embodiment, a transceiver circuit includes a receiver section and a transmitter section. The transmitter section includes a feedback loop connected to a single-ended bus and a control circuit connected to the single-ended bus. The feedback loop includes a tunable low-pass filter and an error amplifier. The control circuit is configured to detect an RF disturbance on the single-ended bus and control the bandwidth of the tunable low-pass filter in response to detection of the RF disturbance on the single-ended bus.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
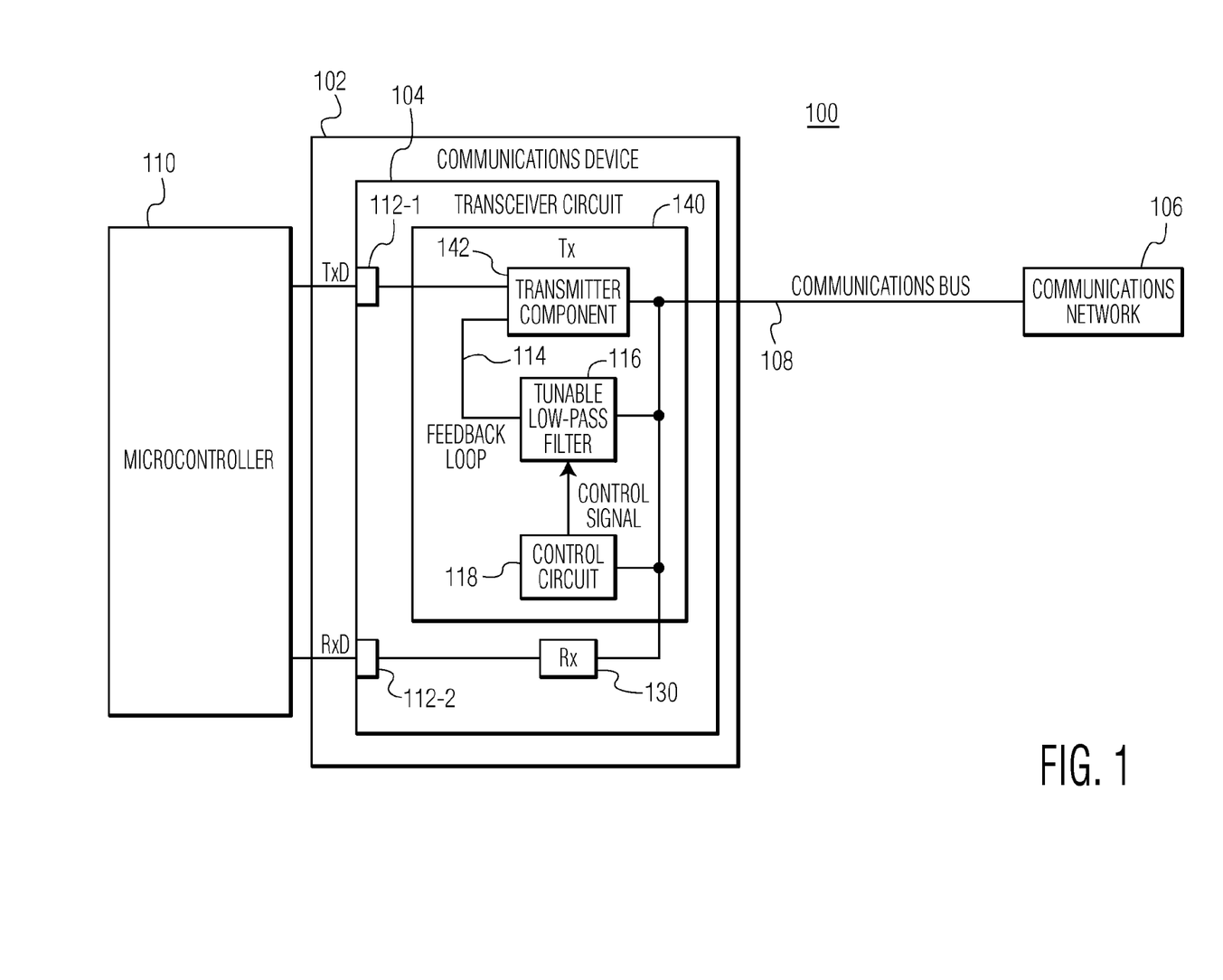
FIG. 1 is a schematic block diagram of a communications system in accordance with an embodiment of the invention.

FIG. 1 is a schematic block diagram of a communications system 100 in accordance with an embodiment of the invention. In the embodiment depicted in FIG. 1, the communications system includes a communication device 102, which includes a transceiver circuit 104, and a communications network 106. The communications system can be used to facilitate communications between communication devices/nodes. In some embodiments, the communications system is used in a vehicle. Examples of a vehicle may include, without limitation, an automobile, a bus, a train, an industrial or agricultural vehicle, a ship, or an aircraft. Although the communications system is shown in FIG. 1 as including certain components, in some embodiments, the communications system includes less or more components to implement less or more functionalities.

The transceiver circuit 104 of the communication device 102 is configured to communicate with other communication devices/nodes. In the embodiment depicted in FIG. 1, the transceiver circuit is configured to communicate with the communications network 106 through a communications bus 108. The communications bus can be any dubitable type of communications bus. In some embodiments, the communications bus is a single-ended communications bus. In the single-ended communications bus, signals are carried by the voltage of a single wire. Compared to a differential communications bus, in which the same information is transmitted with opposite voltages simultaneously through two sets of wires, the single-ended communications bus can be less expensive and easier to implement. For example, compared to differential communications buses, single-ended communications buses use fewer wires, allowing the reduction of harness (e.g., electrical wirings) in a vehicle. In some embodiments, the single-ended communications bus is a bus that is compatible with the Local Interconnect Network (LIN) protocol, which is a serial communication protocol suitable for low cost and high performance in-vehicle network (IVN). In some embodiments, the communications bus is a one wire of a differential bus. The transceiver circuit is also configured to communicate with a microcontroller 110 through input/output (I/O) terminals 112-1, 112-2. The microcontroller may be connected to a sensor/actuator device and to control the sensor/actuator device or gather information from the sensor/actuator device. The sensor/actuator device can be a sensor that is used to collect operating parameters in a vehicle and/or an actuator, such as a controller that is used to control a certain function/component of a vehicle. In some embodiments, instead of the microcontroller, the communications system 100 includes other device that communicates with the transceiver circuit and performs a different function.

In the embodiment depicted in FIG. 1, the transceiver circuit 104 includes a receiver section, "Rx," 130 and a transmitter section, "Tx," 140. The receiver section is connected to the I/O terminal 112-2, from which a data signal, "RxD," is transmitted to the microcontroller 110. In some embodiments, the transmitter section includes a feedback loop 114, which includes a tunable low-pass filter 116, and a control circuit 118, and another transmitter component 142, such as an amplifier device and/or a waveshaping device. The transmitter section is connected to the I/O terminal 112-1, from which a data signal, "TxD," is received from the microcontroller. The feedback loop and the control circuit are connected to the communications bus 108. The control circuit is configured to detect an RF disturbance on the bus and control the bandwidth of the tunable low-pass filter in response to detection of the RF disturbance on the communications bus. In an embodiment, the transceiver circuit adaptively adjusts the tunable low-pass filter based on a continuous-time feedback from the communications bus to protect the feedback loop from high-frequency (HF) disturbances. The transceiver circuit can achieve low electromagnetic (EM) emission and high EM immunity. Specifically, the transceiver circuit can compensate load variations of the communications bus, which allows optimum waveshaping, therefore resulting in low EME. In addition, the transceiver circuit can achieve high EM immunity by changing the bandwidth of the tunable low-pass filter based on the amplitude of high-frequency (HF) disturbance detected on the bus.

The communications network 106 of the communications system 100 is configured to receive data from the communication device 102 and to transmit data to the communication device. In the embodiment depicted in FIG. 1, the communications network is configured to communicate with the transceiver circuit 104 through the communications bus 108.

In some embodiments, the communications system 100 is part of a Local Interconnect Network (LIN). In these embodiments, the communications bus 108 is a LIN bus and the transceiver circuit 104 is compatible with the LIN protocol, e.g., the LIN Specification 2.2.A. Compared to differential IVN protocols, e.g. CAN or FlexRay, a LIN bus is a single-ended bus, thereby allowing the reduction of electrical wirings in a vehicle.

Figure 2:
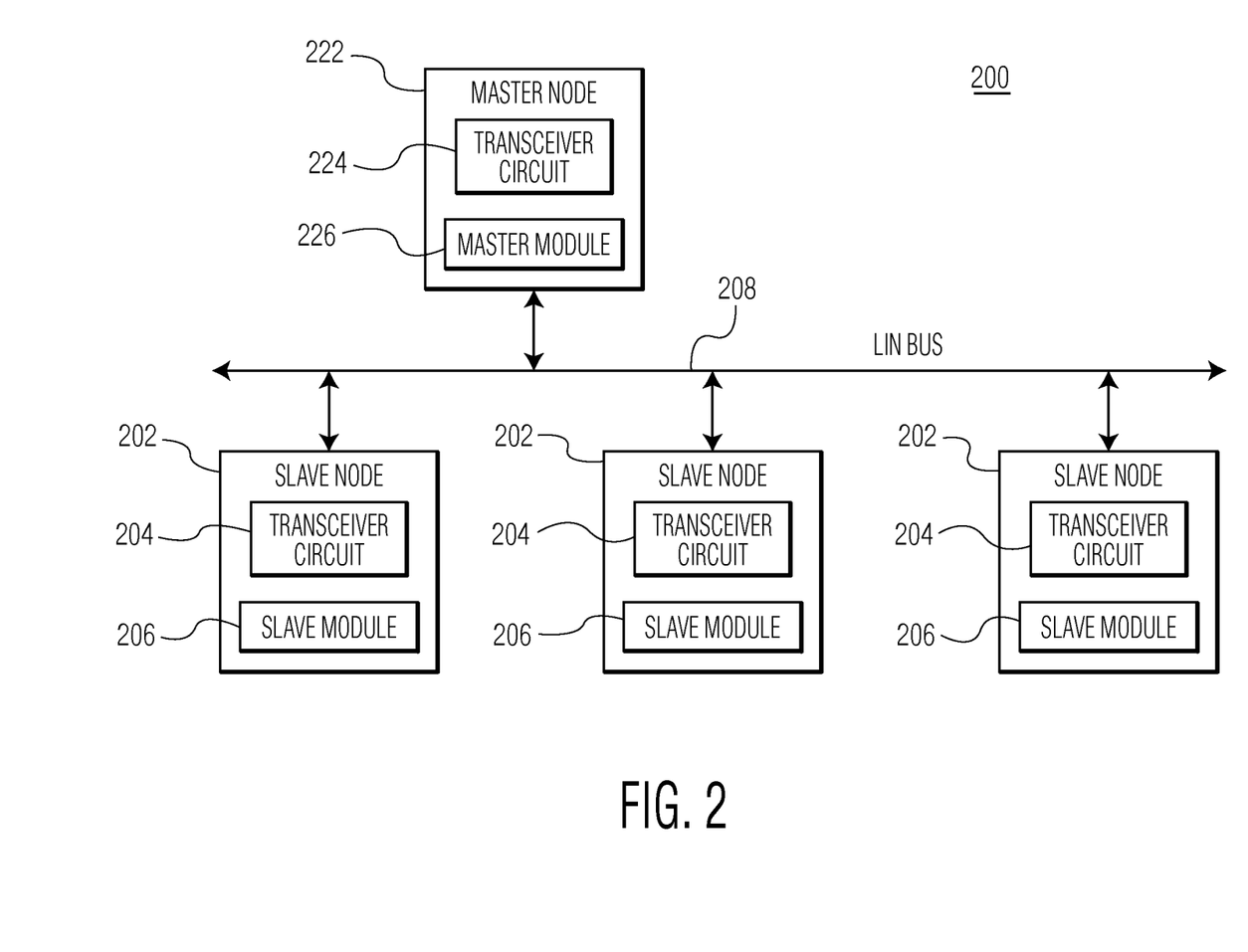
FIG. 2 depicts a communications system that is compatible with the Local Interconnect Network (LIN) protocol.

FIG. 2 depicts a communications system that is compatible with the LIN protocol. In the embodiment depicted in FIG. 2, a LIN communications system 200 includes one or more slave nodes 202 and a master node 222, which acts as a control unit for the slave nodes. The slave nodes and the master node are connected to a LIN bus 208. Each of the slave nodes includes a transceiver circuit 204 and a slave module 206 that can communicate with a corresponding microcontroller or other device using the corresponding transceiver circuit. Each transceiver circuit 204 may be similar to or the same as the transceiver circuit 104. The master node includes a transceiver circuit 224 and a master module 226 that can initiate communications between the master device and a corresponding slave device through the LIN bus. The transceiver circuit 224 may be similar to or the same as the transceiver circuit 104.

Figure 3:
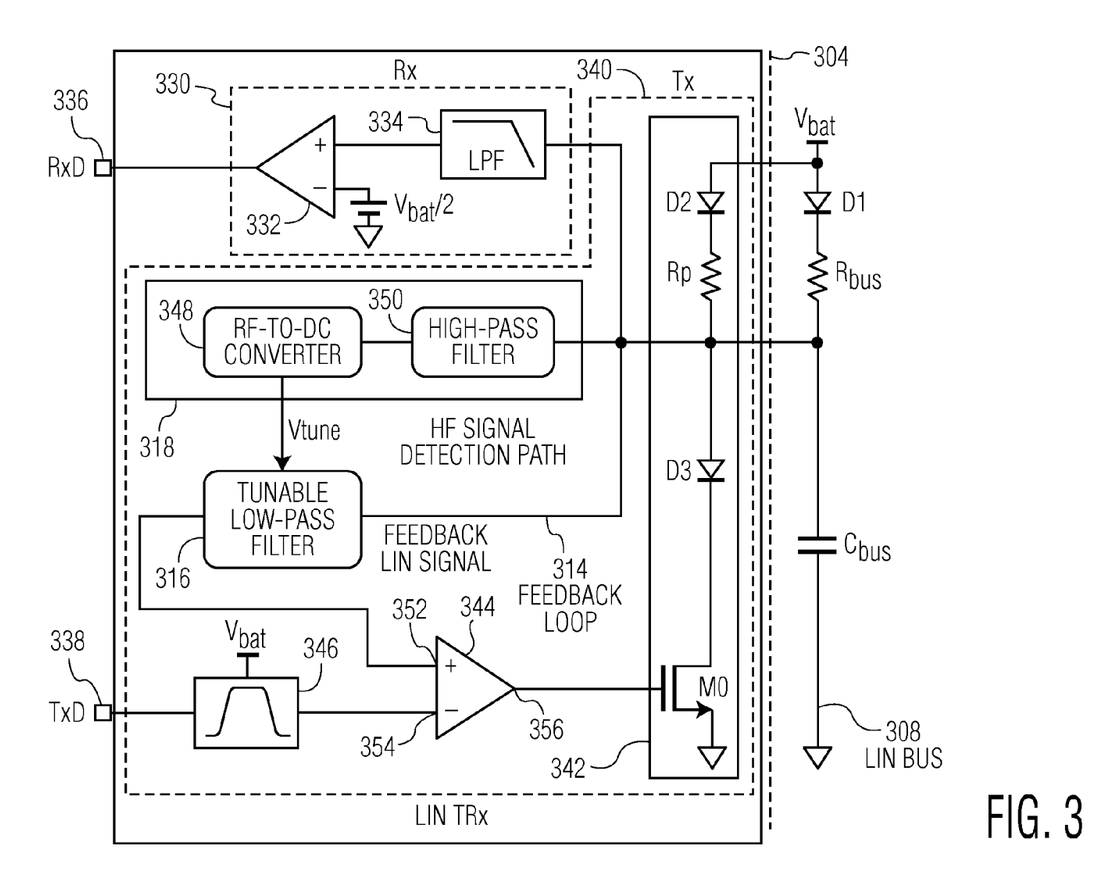
FIG. 3 depicts an embodiment of the transceiver circuit of FIG. 1 that is compatible with the LIN protocol.

FIG. 3 depicts an embodiment of the transceiver circuit 104 of FIG. 1 that is compatible with the LIN protocol. In the embodiment depicted in FIG. 3, a transceiver circuit, "LIN TRx," 304 includes a receiver section, "Rx," 330 and a transmitter section, "Tx," 340. The transceiver circuit depicted in FIG. 3 is one possible embodiment of the transceiver circuit depicted in FIG. 1. However, the transceiver circuit depicted in FIG. 1 is not limited to the embodiment shown in FIG. 3.

The receiver section 330 and the transmitter section 340 of the transceiver circuit 304 are connected to a LIN bus 308. The impedance of the LIN bus is characterized by a resistor, "Rbus," which corresponds to an external termination, such as 1 kΩ master termination and a lumped internal slave termination, connected in series with a diode, D1, and a capacitor, "Cbus," which corresponds to parasitic capacitance and other capacitance (e.g., external decoupling capacitance). The impedance of the LIN bus depends on the number of communications devices and the length of the bus line. Transceiver circuits that are attached to the LIN bus can be switched on and off at any time, thereby changing the resistance of the resistor, Rbus, and the capacitance of the capacitor, Cbus.

The receiver section 330 includes a voltage comparator 332, which may be an error amplifier, and a low-pass filter 334. The voltage comparator is connected to an output terminal 336, from which a data signal, "RxD," received from the LIN bus 308, is transmitted to the microcontroller 110 (shown in FIG. 1) or other device. The low-pass filter is connected to the transmitter section and to the LIN bus. The low-pass filter is used to protect the voltage comparator 332, at which the received signal, RxD, is generated. The receiver section can be implemented as a standard LIN receiver.

The transmitter section 340 includes an output stage or a driving stage 342, an error amplifier or operational amplifier (op-amp) 344, a wave shaping circuit or a waveform generator 346, a tunable low-pass filter 316, and a control circuit 318. The tunable low-pass filter, the error amplifier and the driving stage form a feedback loop 314. The transmitter section is connected to an input terminal 338, from which a data signal, "TxD," is received from the microcontroller 110 (shown in FIG. 1) or other device.

The output stage 342 includes a transistor, "M0," which can be used as a voltage-controlled current source or resistor, diodes, "D2," "D3," and a pull-up resistor, $R_p$. In some embodiments, the pull-up resistor, $R_p$, has a resistance value of 30 kΩ.

The waveform generator 346 is configured to generate an output signal in response to an input signal and a supply voltage, "Vbat," which may be a battery voltage. In some embodiments, a waveform shape of an output signal of the transceiver circuit 304 to the LIN bus 308 is within the requirements of the LIN specifications in the presence of the RF disturbance and load impedance variations on the LIN bus.

The error amplifier 344 has a positive input terminal 352, a negative input terminal 354, and an output terminal 356. The positive input terminal is connected to the tunable low-pass filter 316, the negative input terminal is connected to the waveform generator 346, and the output terminal is connected to the transistor, "M0."

The control circuit 318 includes a high-pass (HF) filter 348 and an RF-to-Direct Current (DC) converter 350. The control circuit is configured to detect the presence of a high-frequency (HF) disturbance on the LIN bus 308 and to tune the bandwidth of the low-pass filter 316. The high-pass filter is connected to the LIN bus and is configured to filter the signal received from the LIN bus. The RF-to-DC converter is connected to the high-pass filter and is configured to detect the presence of an HF disturbance on the LIN bus based on the filtered signal from the high-pass filter and to generate a control signal, "Vtune," to control the bandwidth of the tunable low-pass filter.

In the embodiment depicted in FIG. 3, the transceiver circuit 304 is a continuous-time feedback transceiver that uses adaptive filtering to achieve low EM emission and high EM immunity. For example, the continuous-time feedback from the LIN bus 308 helps to optimize or adapt the driving voltage of the output transistor, M0, which reduces the area overhead of the output transistor, M0. In addition, although the transceiver circuit is compatible with a cascaded output stage, the transceiver circuit does not require a cascaded output stage to maintain low EM emission and high EM immunity.

In an example of the operation of the transceiver circuit 304, LIN bus load variations are compensated for by the continuous-time feedback loop 314, allowing optimum waveshaping and reducing EM emission. The high EM immunity is achieved by changing the bandwidth of the feedback loop (i.e., the bandwidth of the low-pass filter 316) based on the amplitude of HF disturbance detected on the LIN bus 308. Consequently, the transceiver circuit is protected against HF disturbances on the LIN bus.

Figure 4:
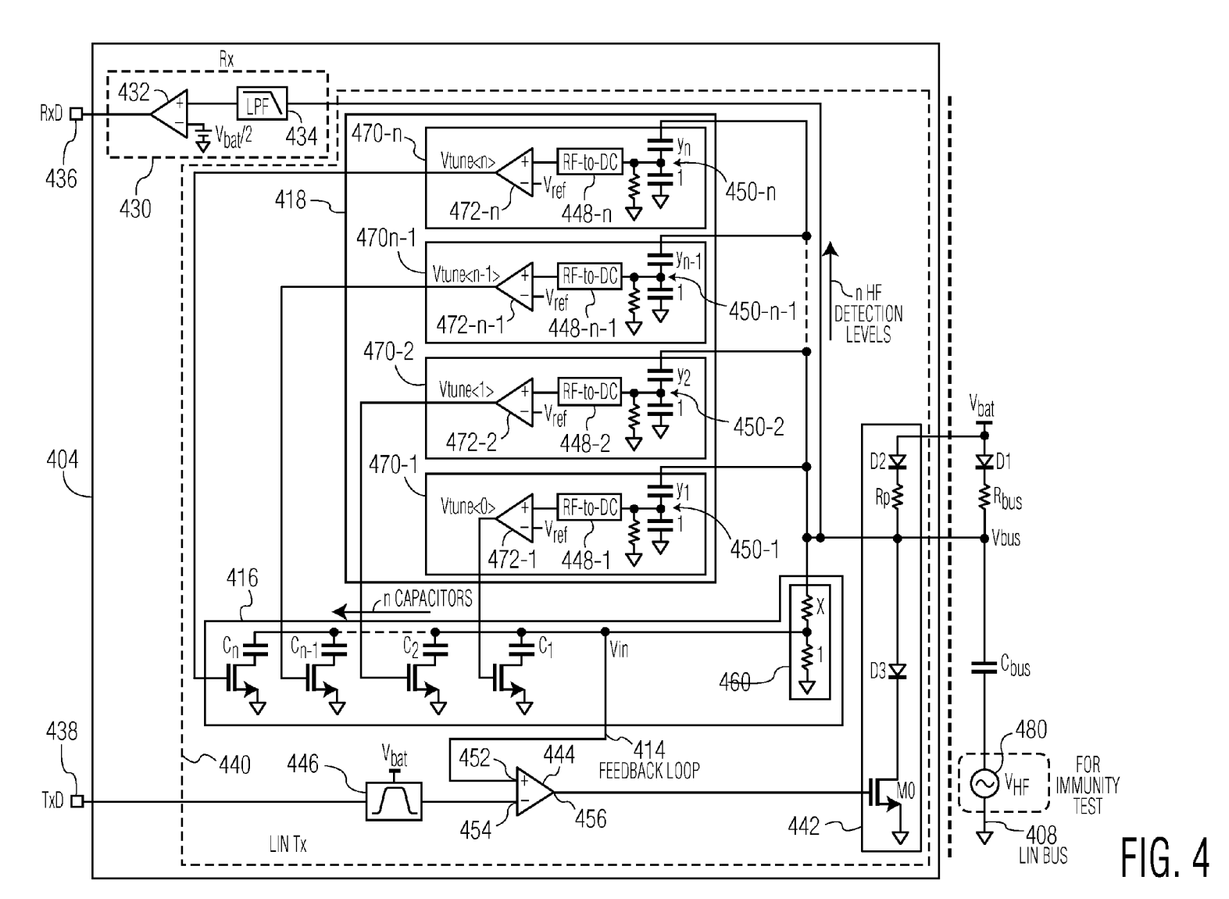
FIG. 4 depicts an embodiment of the transceiver circuit depicted in FIG. 3 that includes a continuous-time bus feedback loop.

In some embodiments, the continuous-time bus feedback loop 314 can be implemented using a low-pass filter, a resistive divider and an error amplifier. FIG. 4 depicts an embodiment of the transceiver circuit 304 depicted in FIG. 3 that includes a continuous-time bus feedback loop 414 having a low-pass filter 416, a resistive divider 460 and an error amplifier 444. In the embodiment depicted in FIG. 4, a transceiver circuit 404 includes a receiver section 430 and a transmitter section 440 that are connected to a LIN bus 408. The impedance of the LIN bus is characterized by a resistor, "Rbus," which corresponds to an external termination, such as 1 kΩ master termination and a lumped internal slave termination, connected in series with a diode, D1, and a capacitor, "Cbus," which corresponds to parasitic capacitance and other capacitance (e.g., external decoupling capacitance). A voltage source 480 with a voltage, "$V_{HF}$," may be connected to the LIN bus to conduct EM immunity tests. The transceiver circuit depicted in FIG. 4 is one possible embodiment of the transceiver circuit depicted in FIG. 3. However, the transceiver circuit depicted in FIG. 3 is not limited to the embodiment shown in FIG. 4.

The receiver section 430 of the transceiver circuit 404 includes a voltage comparator 432, which may be an error amplifier, and a low-pass filter 434. The receiver section is connected to an output terminal 436, from which a data signal, "RxD," received from the LIN bus 408, is transmitted to the microcontroller 110 (shown in FIG. 1) or other device. The receiver section 430 depicted in FIG. 4 may be similar to or the same as the receiver section 330 depicted in FIG. 3.

The transmitter section 440 of the transceiver circuit 404 includes an output stage or a driving stage 442, the resistive divider 460, the error amplifier 444, a wave shaping circuit or a waveform generator 446, a tunable low-pass filter 416, and a control circuit 418. The transmitter section is connected to an input terminal 438, from which a data signal, "TxD," is received from the microcontroller 110 (shown in FIG. 1) or other device.

The output stage 442 includes a transistor, "M0," which can be used as a voltage-controlled current source or resistor, diodes, "D2," "D3," and a pull-up resistor, $R_p$. In some embodiments, the pull-up resistor, $R_p$, has a resistance value of 30 kΩ.

The resistive divider 460 is connected to the LIN bus 408 and to a positive/non-inverting input terminal 452 of the error amplifier 444. The resistive divider has a division factor, "X," where X is a positive integer. The bus voltage, "Vbus," can be expressed as:

$$ \tag{1} $$

where Vin represents the voltage of the signal that is fed to the positive input terminal 452 of the error amplifier, and X represents the division factor of the resistive divider. The resistive divider can feedback the bus signal with an appropriate amplitude for the error amplifier.

In the embodiment depicted in FIG. 4, the error amplifier 444 includes the positive input terminal 452, a negative input terminal 454, and an output terminal 456. The positive input terminal is connected to the tunable low-pass filter 416, the negative input terminal is connected to the waveform generator 446, and the output terminal is connected to the transistor, "M0."

The waveform generator 446 is configured to generate an output signal in response to an input signal and a supply voltage, "Vbat," which may be a battery voltage. In some embodiments, a waveform shape of an output signal of the transceiver circuit 404 to the LIN bus 408 is within the requirements of the LIN specifications in the presence of the RF disturbance and load impedance variations on the LIN bus.

The control circuit 418 includes a number of parallel circuits 470. Each of the parallel circuits 470 includes a high-pass filter 450 with a unique division factor, an RF-to-DC converter 448 connected to the high-pass filter and an error amplifier or operational amplifier (op-amp) 472 connected to the RF-to-DC converter and a reference voltage, "Vref." Each HF filter forms a capacitive divider (with a division factor of $1/(y1+1)$, $1/(y2+1)$, $1/(y(n-1)+1)$ or $1/(y(n)+1)$, where n is a positive integer). By changing the division factor ($1/(y1+1)$, $1/(y2+1)$, $1/(y(n-1)+1)$ or $1/(y(n)+1)$) of a capacitive divider, different HF amplitudes on the LIN bus 408 can be detected, which are used to adjust the bandwidth of the tunable low-pass filter 416.

Figure 5:
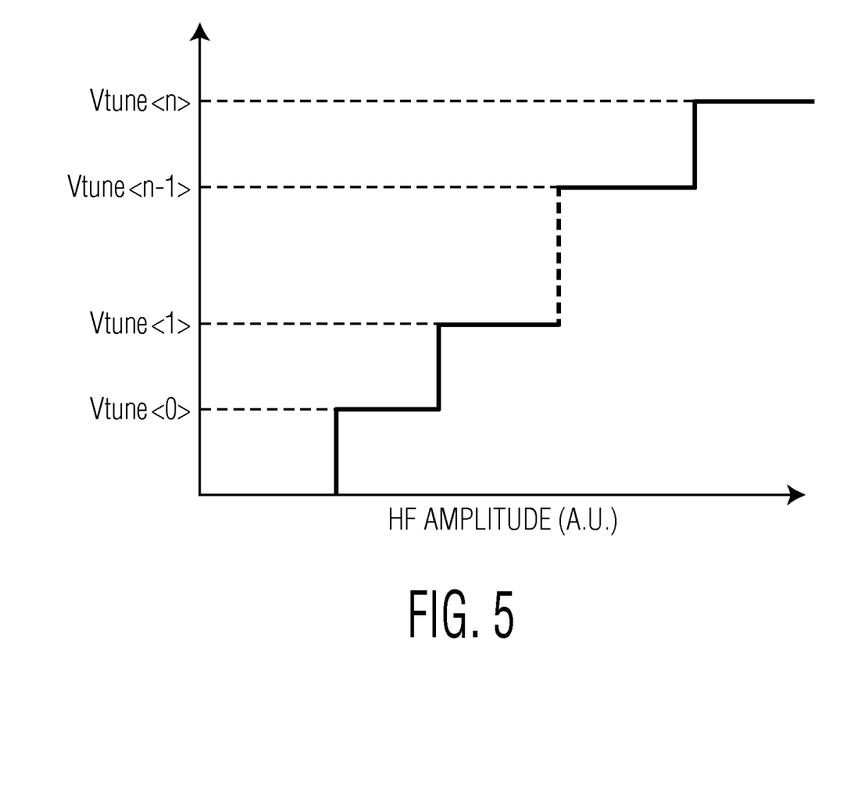
FIG. 5 is a graph of tuning signal versus the amplitude of a high-frequency (HF) LIN bus disturbance of the transceiver circuit depicted in FIG. 4.

The tunable low-pass filter 416 includes a number of capacitors (c1, c2, cn-1, cn), where n is a positive integer. The low-pass filter is configured to have an adjustable bandwidth to protect the error amplifier 444 from RF disturbances on the LIN bus 408, which is important to achieve high EM Immunity. Upon detecting an HF disturbance signal on the LIN bus 408, capacitors (c1, c2, cn-1, cn, where n is a positive integer) are connected in the feedback loop 414 using a set of tuning signals, Vtune<0:n>, to form the low-pass filter 416 together with the resistive divider. FIG. 5 is a graph of tuning signal versus the amplitude of an HF LIN bus disturbance of the transceiver circuit 404 depicted in FIG. 4. As shown in FIG. 5, signals in the set of tuning signals, Vtune<0:n>, are set to high when the HF disturbance amplitude increases.

Figure 6:
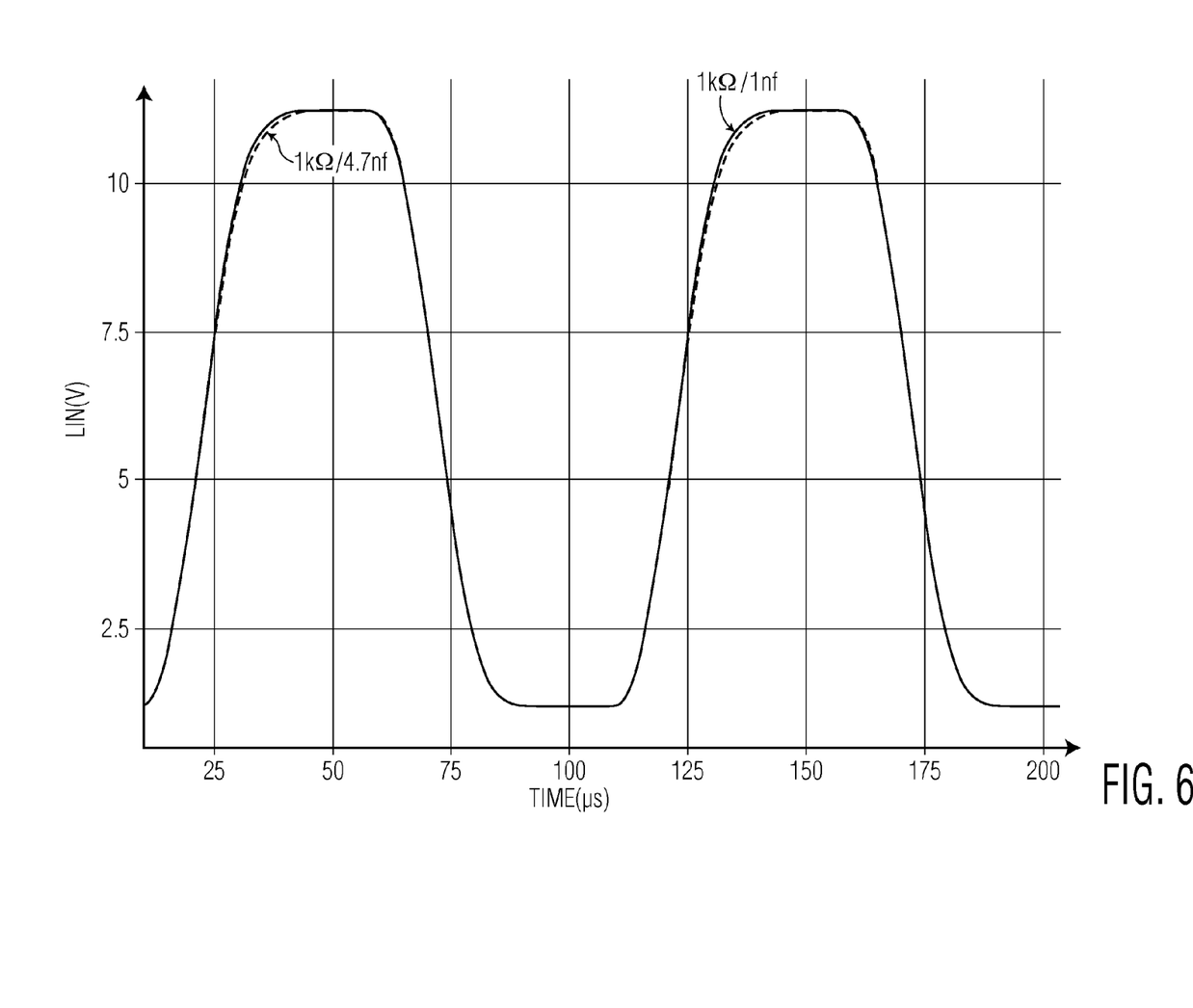
FIG. 6 is a graph of a signal voltage that illustrates transmissions of bits from the transceiver circuit depicted in FIG. 4 under different bus-load conditions.

Returning to FIG. 4, the closed-loop LIN transmitter section 440 of the transceiver circuit 404 can allow the transceiver circuit to have a low EM emission and can compensate for load variations on the LIN bus 408. FIG. 6 is a graph of a signal voltage that illustrates transmissions of bits from the transceiver circuit depicted in FIG. 4 under different bus-load conditions. In a first bus-load condition, the LIN bus has a resistance of 1142 and a capacitance of 4.7nf. In a second bus-load condition, the LIN bus has a resistance of 1 kΩ and a capacitance of 1 nf. As shown in FIG. 6, the transceiver circuit 404 can cope with different bus-load conditions.

Figure 7:
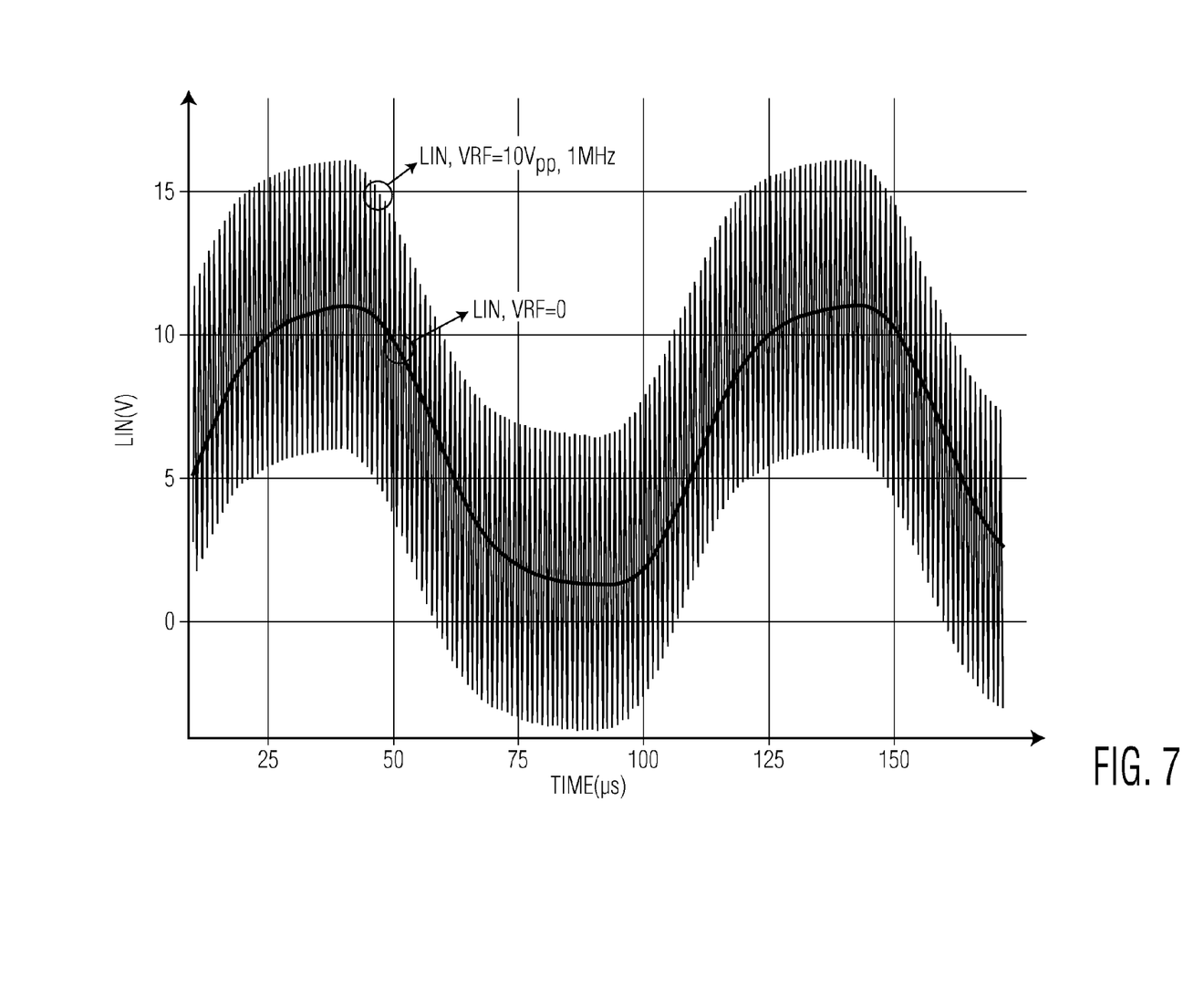
FIG. 7 is a graph of an EM Immunity simulation of the transceiver circuit depicted in FIG. 4.

FIG. 7 is a graph of an EM Immunity simulation of the transceiver circuit 404 depicted in FIG. 4. In the simulation diagram shown in FIG. 7, the transmission of some bits is simulated while a sinewave of 10 Vpeak-to-peak at 1 MHz is injected onto the LIN bus 408. In particular, FIG. 7 shows a waveform of a reference LIN signal when no HF disturbances (VRF=0) are applied and a waveform of a LIN signal (VRF=10Vpp) while a sinewave is applied. Consequently, a high-frequency (HF) signal is present on the LIN bus while the average amplitude swings from recessive to dominant states. The comparison with a LIN signal transmitted without the injection of HF disturbance shows that the average recessive voltage, dominant voltage and the slew rate are kept under control using the HF detection that sets an appropriate feedback-loop bandwidth.

Figure 8:
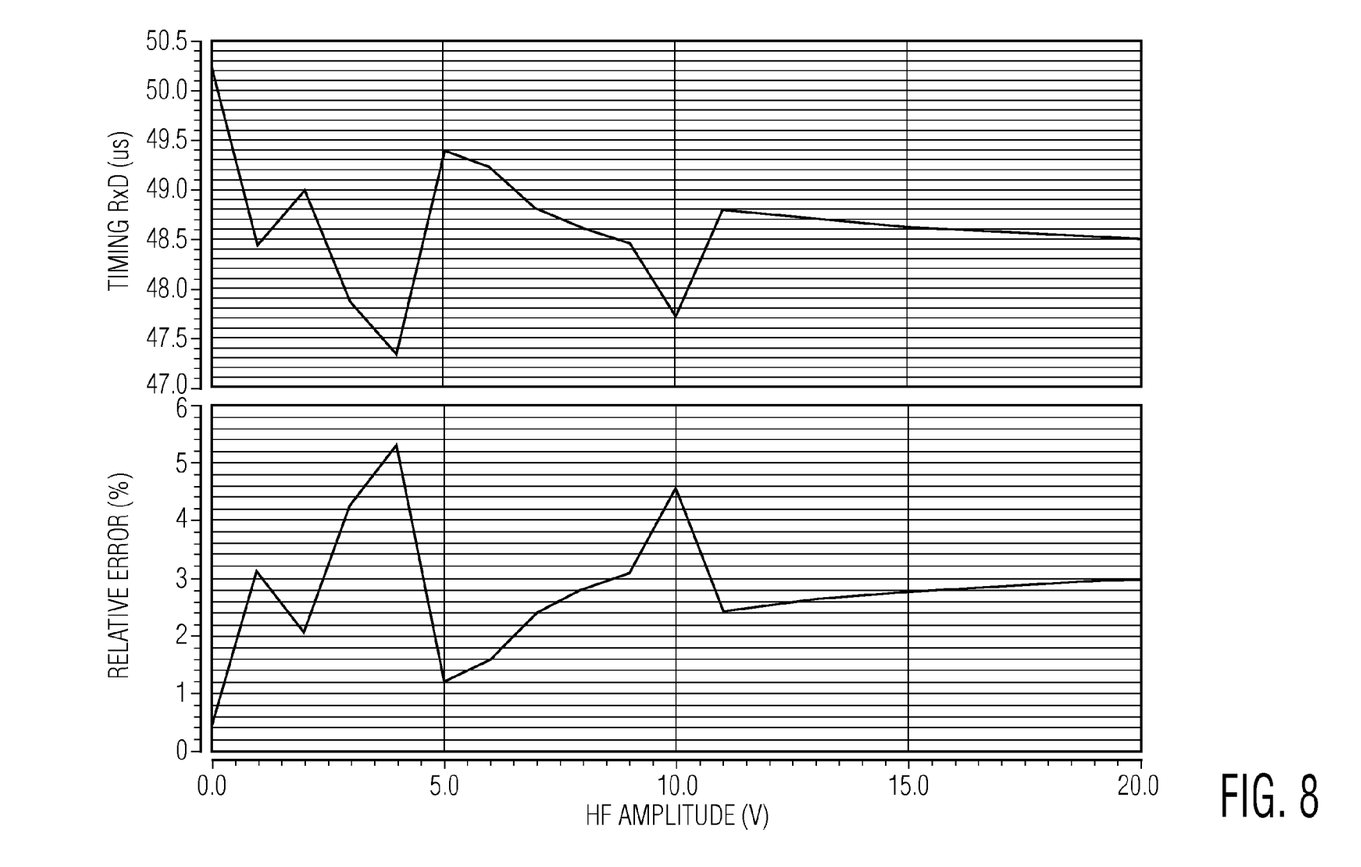
FIG. 8 is a graph representing the bit time of a received signal of the transceiver circuit depicted in FIG. 4 during an EM Immunity simulation.

FIG. 8 is a graph representing the bit time of a received signal of the transceiver circuit 404 depicted in FIG. 4 during an EM Immunity simulation. In the diagram shown in FIG. 8, the received signal, RxD, relative to 50 μs is plotted for HF amplitudes up to 20V (40Vpeak-to-peak) and an error that is calculated relative to 50 us (as on TxD) is also plotted. In the graph depicted in FIG. 8, the jitter of the signal RxD is limited, while a maximum error is lower than the maximum error allowed. Consequently, the transceiver circuit 404 depicted in FIG. 4 can achieve a lower EM emission than a conventional open-loop approach and good EM immunity.

Figure 9:
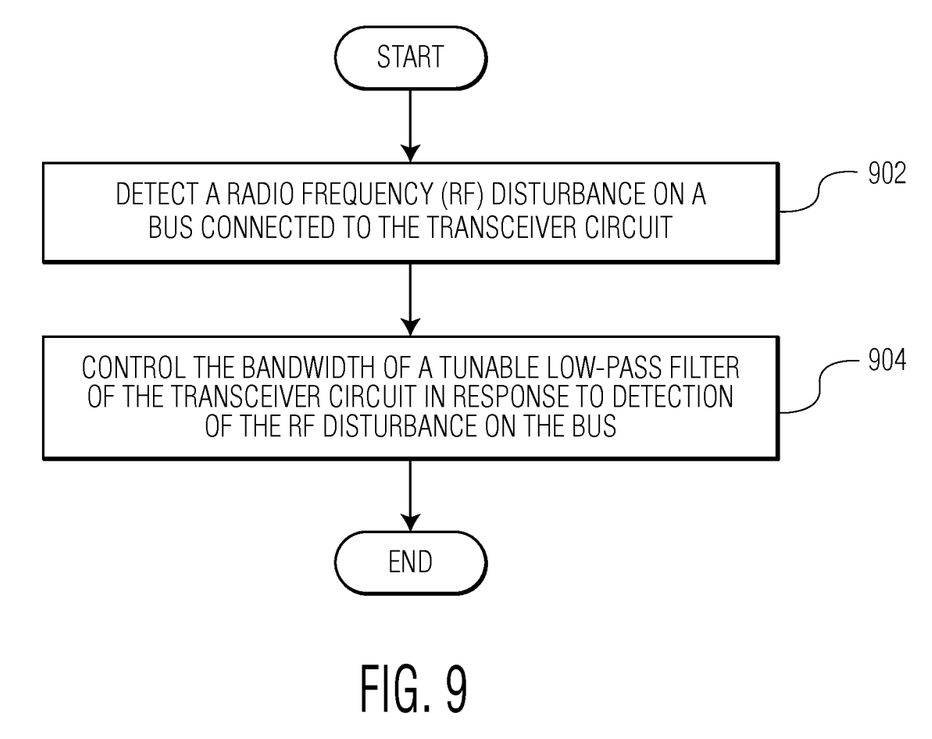
FIG. 9 is a process flow diagram of a method for operating a transceiver circuit in accordance with an embodiment of the invention.

FIG. 9 is a process flow diagram of a method for operating a transceiver circuit in accordance with an embodiment of the invention. The transceiver circuit may be similar to or the same as the transceiver circuit 104 depicted in FIG. 1, the transceiver circuit 204 or 224 depicted in FIG. 2, the transceiver circuit 304 depicted in FIG. 3, and/or the transceiver circuit 404 depicted in FIG. 4. At block 902, an RF disturbance on a bus connected to the transceiver circuit is detected. At block 904, the bandwidth of a tunable low-pass filter of the transceiver circuit is controlled in response to detection of the RF disturbance on the bus.

Figure 10:
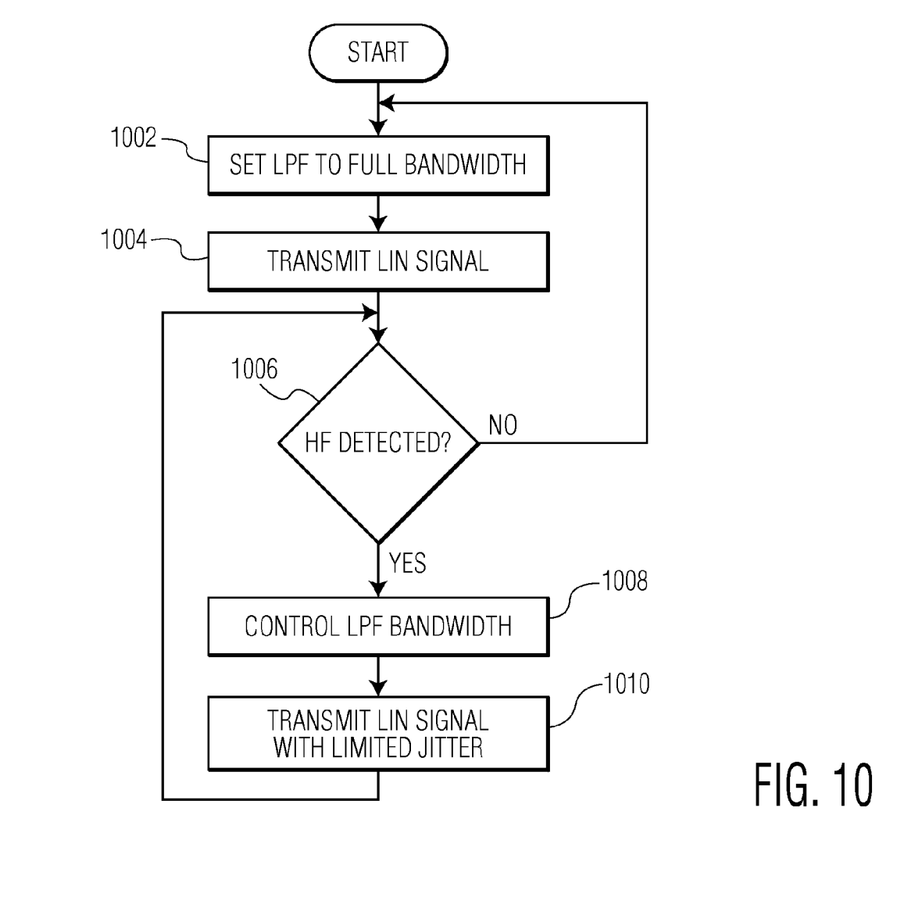
FIG. 10 is a process flow diagram of a method for operating a transceiver circuit in accordance with another embodiment of the invention.

FIG. 10 is a process flow diagram of a method for operating a transceiver circuit in accordance with another embodiment of the invention. The transceiver circuit may be similar to or the same as the transceiver circuit 104 depicted in FIG. 1, the transceiver circuit 204 or 224 depicted in FIG. 2, the transceiver circuit 304 depicted in FIG. 3, and/or the transceiver circuit 404 depicted in FIG. 4. At step 1002, a low-pass filter of the transceiver circuit is set to full bandwidth. At step 1004, a LIN signal is transmitted (e.g., as the data signal, RxD, through the output terminal 436). At step 1006, a detection of high frequency (HF) disturbance of the LIN signal is performed. If HF disturbance is detected, the bandwidth of the low-pass filter of the transceiver circuit is controlled at step 1008, a LIN signal with limited jitter is transmitted (e.g., as the data signal, RxD, through the output terminal 436) at step 1010, and the method goes back to step 1006. If HF disturbance is not detected, the method goes back to step 1002.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A transceiver circuit, the transceiver circuit comprising:
   a feedback loop connected to a bus, wherein the feedback loop comprises a tunable low-pass filter; and
   a control circuit connected to the bus and configured to:
      detect a radio frequency (RF) disturbance on the bus; and
      control the bandwidth of the tunable low-pass filter in response to detection of the RF disturbance on the bus.

2. The transceiver circuit of claim 1, wherein the control circuit is further configured to change the bandwidth of the tunable low-pass filter based on an amplitude of the RF disturbance on the bus.

3. The transceiver circuit of claim 1, wherein the control circuit comprises:
   a high-pass filter connected to the bus; and
   an RF-to-Direct Current (DC) converter connected to the high-pass filter and configured to generate a control signal to control the bandwidth of the tunable low-pass filter.

4. The transceiver circuit of claim 3, wherein the high-pass filter comprises a capacitive divider.

5. The transceiver circuit of claim 1, wherein the control circuit comprises a plurality of parallel circuits, and wherein each of the parallel circuits comprises:

a high-pass filter with a unique division factor;
an RF-to-Direct Current (DC) converter connected to the high-pass filter; and
an error amplifier connected to the RF-to-DC converter and a reference voltage.

6. The transceiver circuit of claim 5, wherein the tunable low-pass filter comprises a resistive divider and selectable capacitors.

7. The transceiver circuit of claim 1, wherein the control circuit comprises a plurality of high-pass filters with different division factors.

8. The transceiver circuit of claim 1, wherein the transceiver circuit further comprises:
a waveform generator configured to generate an output signal in response to an input signal and a supply voltage.

9. The transceiver circuit of claim 8, wherein the feedback loop further comprises:
an error amplifier with a first input terminal and a second input terminal, wherein the first input terminal is connected to the tunable low-pass filter, and wherein the second input terminal is connected to the waveform generator.

10. The transceiver circuit of claim 9, wherein the bus is a single-ended bus.

11. The transceiver circuit of claim 9, wherein the transceiver circuit further comprises:
an output stage configured to be driven by the feedback loop.

12. The transceiver circuit of claim 11, wherein the output stage comprises:
a transistor connected to an output terminal of the error amplifier;
a resistor; and
at least one diode.

13. The transceiver circuit of claim 11, wherein the transceiver circuit comprises a receiver section and a transmitter section, and wherein the transmitter section comprises the feedback loop, the control circuit, the waveform generator, and the output stage.

14. The transceiver circuit of claim 1, wherein the transceiver circuit comprises a receiver section connected to the bus, and wherein a jitter of an output signal of the receiver section is limited in response to an adjustment of the bandwidth of the tunable low-pass filter.

15. A method for operating a transceiver circuit, the method comprising:

detecting a radio frequency (RF) disturbance on a bus connected to the transceiver circuit; and
controlling the bandwidth of a tunable low-pass filter of the transceiver circuit in response to detection of the RF disturbance on the bus.

16. The method of claim 15, wherein the bus is a single-ended bus, and wherein controlling the bandwidth of the tunable low-pass filter of the transceiver circuit in response to detection of the RF disturbance on the single-ended bus comprises changing the bandwidth of the tunable low-pass filter based on an amplitude of the RF disturbance on the single-ended bus.

17. A transceiver circuit, the transceiver circuit comprising a receiver section and a transmitter section, the transmitter section comprises:
a feedback loop connected to a single-ended bus, wherein the feedback loop comprises a tunable low-pass filter and an error amplifier; and
a control circuit connected to the single-ended bus and configured to:
detect a radio frequency (RF) disturbance on the single-ended bus; and
control the bandwidth of the tunable low-pass filter in response to detection of the RF disturbance on the single-ended bus.

18. The transceiver circuit of claim 17, wherein the transmitter section further comprises:
a waveform generator configured to generate an output signal in response to an input signal and a supply voltage; and
an output stage configured to be driven by the feedback loop.

19. The transceiver circuit of claim 18, wherein the control circuit comprises:
a high-pass filter connected to the single-ended bus; and
an RF-to-Direct Current (DC) converter connected to the high-pass filter and configured to generate a control signal to control the bandwidth of the tunable low-pass filter,
and wherein the tunable low-pass filter comprises:
a plurality of capacitors that are connected in parallel with each other; and
a resistive divider connected to the capacitors.

20. The transceiver circuit of claim 17, wherein the single-ended bus is a Local Interconnect Network (LIN) bus.

* * * * *

UNITED STATES PATENT AND TRADEMARK OFFICE
CERTIFICATE OF CORRECTION

PATENT NO. : 9,166,646 B1
APPLICATION NO. : 14/468034
DATED : October 20, 2015
INVENTOR(S) : Deloge et al.

Page 1 of 1

It is certified that error appears in the above-identified patent and that said Letters Patent is hereby corrected as shown below:

On the title page item [72], replace "Mattieu Deloge" with -- "Matthieu Deloge"

Signed and Sealed this
Twelfth Day of July, 2016

Michelle K. Lee
*Director of the United States Patent and Trademark Office*